INVENTOR.
JOHN J. AMERO

United States Patent Office 3,450,515
Patented June 17, 1969

3,450,515
METHOD OF MAKING IMPREGNATED SINTERED BAUXITE GRAINS AND THE PRODUCT THEREOF
John J. Amero, Shrewsbury, Mass., assignor to Norton Company, Worcester, Mass., a corporation of Massachusetts
Filed Mar. 8, 1963, Ser. No. 263,960
Int. Cl. B24d 3/34, 3/14
U.S. Cl. 51—307        2 Claims

ABSTRACT OF THE DISCLOSURE

Sized particles of calcined bauxite are impregnated with aqueous solution of manganese iron or copper ions and fired for at least 2 hours at at least 1600° C. to produce general purpose and precision type abrasive directly to size. Individual grains consist of agglomerated alpha alumina crystals of size between 50 and 200 microns.

---

Figure 1:
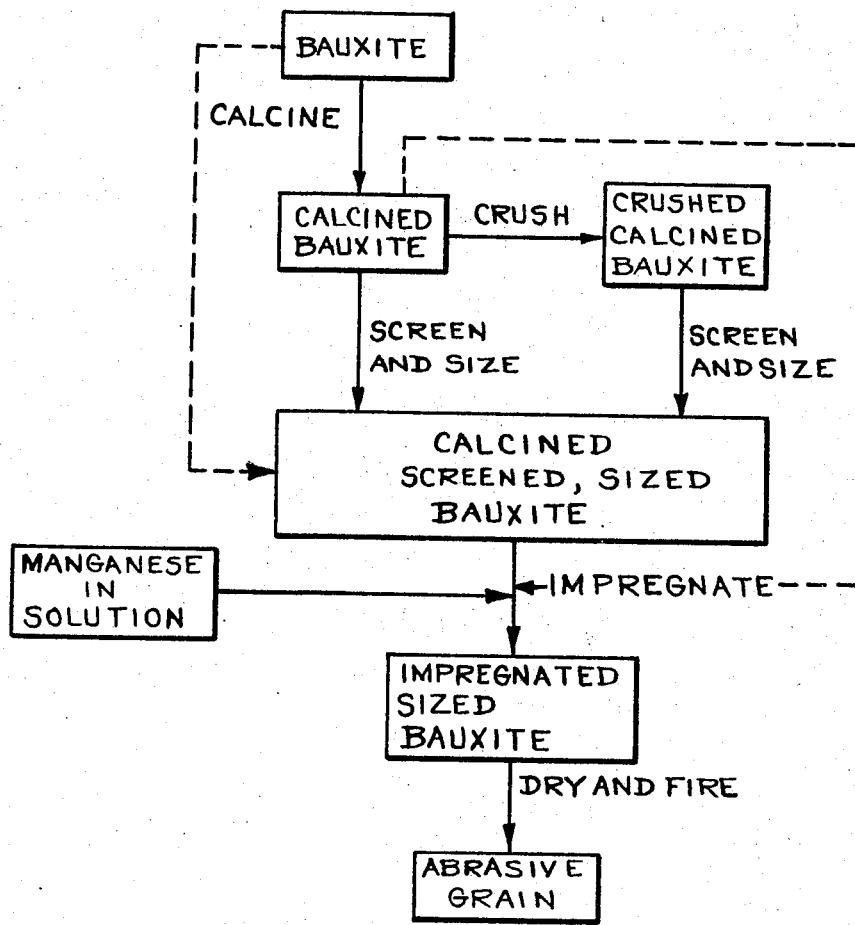

Except for recently developed sintered abrasive grains for use in snagging operations on stainless steel, commercial manufactured aluminum abrasive particles suitable for grinding applications have been made exclusively by fusion processes in which the raw materials are melted to form a liquid which is subsequently cooled and crushed into abrasive sized particles. Such a fusion process requires large amounts of power and conversion of the fused pig to abrasive sized grains involves expensive handling. Although recently aluminous abrasives produced by sintering have been on the market, such abrasives have not been employed in general purpose grinding or in precision grinding. Their utility has been limited to specific grinding applications such as the snagging of stainless steel billets.

The present invention provides a new aluminous abrasive material, manufactured without employing a fusion step, which is useful for abrasive purposes generally for which fused abrasives have previously been employed, as a general purpose snagging abrasive and for precision grinding. The abrasive of this invention can, in fact, substantially equal or even out-perform certain grades of fused aluminous abrasives in precision grinding applications.

One of the objects of this invention is therefore to provide generally useful aluminous abrasive grains without employing a fusion process.

Another object is to provide a new and economical abrasive grain for precision grinding.

Another object is to provide a sintered abrasive for foundry snagging.

Another object of the present invention is to provide an improved process for the production of aluminous abrasive materials.

The flow sheet shown in the drawing is exemplary of the process employed to produce the novel abrasive grains of this invention.

In brief, the abrasive of this invention may be produced by sintering bauxite which has been impregnated with a solution of a manganese compound, e.g. $MnCl_2$. The bauxite is preferably reduced to the desired size before firing and the firing is carried out in the temperature range of from 1600° C. to 1800° C.

Useful abrasives have been produced by employing firing temperatures as low as 1500° C., but their overall abrasive quality has been poorer than those fired around 1600° C. and higher. With regard to the upper limit, 1800° C. is about the maximum practical temperature for existing equipment and materials.

Figure 2:
Figure 3:
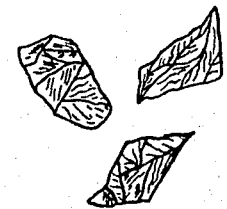

For purposes of explanation reference is made to the accompanying drawing in which:
FIGURE 1 is a flow diagram of the process;
FIGURE 2 is an artist's representation of the abrasive grain of this invention; and
FIGURE 3 is an artist's representation of conventional fused alumina abrasives for comparison purposes.

As illustrated in the flow diagram FIGURE 1, it has been found that impregnation of calcined particles of bauxite by manganese salts, followed by drying and firing of the particles at temperatures above 1600° C. results in abrasive particles equivalent and in some cases superior to conventional arc-furnace fused aluminum oxide abrasive.

The following examples serve to illustrate specific applications of the invention:

EXAMPLE I

Suriname bauxite calcined at 1000° C. to 1100° C. analyzing approximately 88% $Al_2O_3$, the remainder essentially iron oxides, titania and silica, was screened and sized to give four groups of sizes as follows:

Unfired Sizing (1) Through 8 on 10 mesh (T8 on 10)
(2) T10 on 12
(3) T12 on 16
(4) T34 on 54

The screens employed had square openings as follows:

| Mesh: | Width of opening |
|---|---|
| 8 | .1 |
| 10 | .08 |
| 12 | .065 |
| 16 | .0495 |
| 34 | .0248 |
| 44 | .0185 |
| 54 | .0138 |

The sized particles of bauxite were placed in a container and completely covered with an aqueous solution of manganese chloride in water containing 6 grams of $MnCl_2$ in each 100 cc. of water. The solution was decanted from the bauxite after 5 minutes and the bauxite particles were allowed to dry.

The bauxite particles were then placed in refractory containers and fired in a gas fired furnace and held at a temperature of 1700° C. for 6 hours. After cooling in the furnace the fired abrasive grains were removed and the aggregates of particles were broken up by a mild mulling action with a mortar and pestle. The requirement for mulling can be eliminated by firing the particles in a single layer or by firing in a rotary or rocking kiln to eliminate or reduce the formation of aggregates during firing.

The fired sizing of the four size groups was as follows:

Fired sizing (1) 12 grit
(2) 14 grit
(3) 16 grit
(4) 46 grit (T44 on 54)

Microscopic examination of the product showed considerable crystal growth with lath shaped crystals predominating.

The size groups (1), (2), and (3) were fabricated into organic bonded wheels for snagging wheel tests and the 46 grit size was fabricated into vitrified wheels for precision grinding tests.

Examples II–XVI

Additional examples, carried out by the same techniques as in Example I, are tabulated below in Table I.

TABLE I

| | Impregnant MnCl₂, gms./100 cc. Water | Firing temperature, °C. | Time at temperature, hrs. |
|---|---|---|---|
| II | 12.5 | 1,600 | 6 |
| III | 25.0 | 1,600 | 6 |
| IV | 3.0 | 1,650 | 6 |
| V | 6.0 | 1,650 | 6 |
| VI | 3.0 | 1,650 | 12 |
| VII | 6.0 | 1,650 | 12 |
| VIII | 12.5 | 1,650 | 6 |
| IX | 12.5 | 1,700 | 6 |
| X | 25.0 | 1,700 | 6 |
| XI | 37.5 | 1,700 | 6 |
| XII | 3.0 | 1,750 | 6 |
| XIII | 6.0 | 1,750 | 6 |
| XIV | 9.0 | 1,750 | 6 |
| XV | 6.0 | 1,650 | 2 |
| XVI | 6.0 | 1,750 | 12 |

Grinding tests with the above products showed consistent superiority of the grain of my invention in the snagging of cast steel (although inferior in the snagging of stainless steel) in comparison to presently commercially available sintered abrasives such as described in U.S. Patent No. 3,079,243. In precision grinding (46 grit) the product performed at least as well as standard fused alumina.

The abrasive grains as produced by the above examples have a hardness of about 9 on Mohs' scale, are knobbly, blocky grains consisting of agglomerated crystals the majority of which crystals in those grains examined have ranged in particle size from 50 to 200 microns. Grains in which the average crystal size is around 100 microns and higher are preferred. FIGURE 2 shows an artist's conception of abrasive grains such as produced by this invention while FIGURE 3 illustrates abrasive grains of the conventional fused type. The relatively large crystals comprising the grains of this invention are readily apparent in the sparkle of the grains when observed by reflected light by the naked eye.

The following table, Table II, compares the strength of grain of the product of this invention with presently available commercially produced abrasive grain. The grain strength is represented by the percent survival of abrasive grains subjected to impact fracture imposed by centrifugal flinging of the grain against a wall. As will be noted the grain of the present invention is comparable to conventional fused abrasives and can be distinguished from the sintered bauxite product suitable for snagging of stainless steel under high grinding pressure. In foundry snagging, general grinding, and precision grinding, a weaker grain appears more desirable than the high strength grain required for stainless steel snagging. On the other hand, the grain strength should not be considerably below the lowest values in the table and should be comparable to the grain strength of fused abrasive. As can be seen in the table, the grain strength of the product of this invention can be controlled within wide limits.

TABLE II

| | Grain strength as percent survival |
|---|---|
| Example I | 12.1 |
| Example II | 16.1 |
| Example III | 21.6 |
| High purity fused alumina | 12.5 |
| Regular fused alumina | 30.0 |
| Commercial sintered bauxite product produced according to U.S. Patent No. 3,079,243 | 50.6 |

In grinding tests, the sintered abrasives of the present invention were equivalent in performance and in some cases superior to standard fused abrasive of the prior art. The abrasive was compared in both cast steel snagging operations and in precision grinding operations and in ceramic bonded and organic bonded wheels. In contrast the commercially available sintered abrasive product, although superior to both fused abrasives and the product of this invention for snagging stainless steel under high grinding pressures, was unsatisfactory for cast steel snagging, general purpose, and precision grinding as compared with the abrasive of the present invention.

In general any commercial grade of bauxite may be employed in the process of the present invention, but we prefer to employ those bauxites low in silica. Although we employ calcined bauxite for reasons of economy and ease in processing, as indicated by the dotted lines in the flow sheet, uncalcined bauxite could be employed provided that the firing step is carried out slowly enough to prevent disintegration or disturbance of the agglomerates during the elimination of water.

For practical applications it appears most convenient to crush, screen, and size the calcined bauxite before further process steps. However, as indicated by the dotted line, the calcined bauxite, as received, could be impregnated and fired, if desired. In this case a sizing step might be necessary before the firing step in order to produce fired grains to size.

Although the chloride is a suitable and convenient soluble salt of manganese for impregnation of the bauxite, any soluble salt of manganese which decomposes at the firing temperature to yield an oxide of manganese is suitable for use in the process. Sulfates, nitrates, and soluble organic compounds may be successfully employed. In general, it is only necessary that the manganese be in a liquid solution capable of uniformly impregnating the particles and capable of being transformed to the oxide at the firing temperature.

The amount of manganese oxide in the fired product can vary fairly widely. Solution strengths may vary from 3 g. of $MnCl_2$ per 100 grams of water to 40 grams per 100 grams of water. Such solutions result in fired products containing manganese in an amount equivalent to from 0.5 to 10% weight percent of $MnO_2$, although all of the manganese may not be in the form of $MnO_2$.

Other metal salts promote crystal growth in the process of this invention and can be substituted for the manganese salts. Suitable metals are copper and iron. Treatment of bauxite according to this invention with copper salts and with iron salts achieve superior results substantially equivalent to those achieved with manganese salts. Treatment with soluble magnesia salts, however, fails to produce crystal growth. Similarly treatment with sodium silicate or with silicic acid fails to produce the desired results.

With regard to the time of heat treatment, reference to Table I shows the minimum combination of time and temperature to be shown in Example XV. The product so produced, i.e. at 1650° C. for two hours, was satisfactory. Accordingly, I choose as the minimum effective heat treatment a treatment equivalent to a time of two hours at about 1600° C. Obviously at higher temperatures a shorter time will produce an equivalent sintering action.

What is claimed is:

1. The method of making abrasive grains suitable for general purpose and precision grinding comprising impregnating sized particles of calcined bauxite with an aqueous solution including manganese ions in an amount equivalent to from 3 to 40 grams of $MnCl_2$ per 100 grams of water, and firing said particles to size without further crushing for at least equivalent to two hours at at least 1600° C., whereby crystals of a size between 50 microns and 200 microns are produced in said grains.

2. An abrasive grain composed of agglomerated crystals, said crystals having a particle size between 50 and 200 microns, said grain consisting essentially of sintered bauxite and a metal oxide selected from the group consisting of manganese, copper, and iron, in an amount of from 0.5 to 10%.

References Cited

UNITED STATES PATENTS

| | | | |
|---|---|---|---|
| 2,725,286 | 11/1955 | Coes | 51—298 |
| 3,079,243 | 2/1963 | Ueltz | 51—298 |
| 2,360,841 | 10/1944 | Baumann et al. | 51—309.1 |
| 2,685,528 | 8/1954 | Robinson | 106—65 |

FOREIGN PATENTS

| | | |
|---|---|---|
| 755,515 | 8/1956 | Great Britain. |
| 867,833 | 5/1961 | Great Britain. |

DONALD J. ARNOLD, *Primary Examiner.*

U.S. Cl. X.R.

51—308, 309; 106—65